US008205594B2

(12) United States Patent
Fore et al.

(10) Patent No.: US 8,205,594 B2
(45) Date of Patent: Jun. 26, 2012

(54) GENSET CONTROL SYSTEM HAVING PREDICTIVE LOAD MANAGEMENT

(75) Inventors: Bryan M. Fore, Griffin, GA (US); Scott R. Conway, Griffin, GA (US)

(73) Assignee: Caterpillar Inc., Peoria, IL (US)

( * ) Notice: Subject to any disclaimer, the term of this patent is extended or adjusted under 35 U.S.C. 154(b) by 470 days.

(21) Appl. No.: 12/289,500

(22) Filed: Oct. 29, 2008

(65) Prior Publication Data

US 2010/0106389 A1 Apr. 29, 2010

(51) Int. Cl.
*G06F 19/00* (2006.01)
*F02D 41/00* (2006.01)

(52) U.S. Cl. ................. 123/339.18; 701/113; 290/40 B; 290/40 C; 322/20

(58) Field of Classification Search ................ 290/40 R, 290/40 A, 40 B, 40 C; 322/17-25; 701/101, 701/103, 110; 123/339.18
See application file for complete search history.

(56) References Cited

U.S. PATENT DOCUMENTS 3,597,623 A * 8/1971 Gilardi ........................ 290/40 R
3,636,368 A * 1/1972 Sia .................................. 307/64
3,771,821 A * 11/1973 Rist et al. ......................... 290/14
4,268,787 A * 5/1981 Sloan ................................ 322/8
4,317,177 A * 2/1982 Burnworth ..................... 700/293
4,633,093 A * 12/1986 Otobe et al. ................ 290/40 R
5,055,765 A 10/1991 Rozman et al.
5,153,446 A * 10/1992 Shimomura ................ 290/40 C
5,157,321 A * 10/1992 Kato et al. ....................... 322/28
5,280,232 A 1/1994 Kohl et al.
5,429,089 A * 7/1995 Thornberg et al. ........... 123/352
5,561,363 A * 10/1996 Mashino et al. ................ 322/25
5,672,954 A 9/1997 Watanabe
6,066,897 A 5/2000 Nakamura
6,285,178 B1 * 9/2001 Ball et al. ....................... 323/351
6,348,743 B1 * 2/2002 Sakasai et al. .............. 290/40 B
6,564,774 B2 * 5/2003 Ellims et al. .................. 123/352
6,624,618 B2 9/2003 Kernahan et al.
6,763,296 B2 7/2004 Aldrich, III et al.
7,027,944 B2 4/2006 Tabaian et al.
7,030,580 B2 * 4/2006 Hoff .............................. 318/141
7,098,628 B2 8/2006 Maehara et al.
7,170,262 B2 * 1/2007 Pettigrew ........................ 322/32
7,183,749 B2 2/2007 Maehara
7,256,507 B2 * 8/2007 Endou et al. ................ 290/40 A
7,552,006 B2 * 6/2009 Maeda .......................... 701/102
7,805,937 B2 * 10/2010 Cochet et al. ................... 60/602
7,905,813 B2 * 3/2011 Edelson et al. ............... 477/110
2006/0174629 A1 8/2006 Michalko
2007/0137910 A1 6/2007 Imura et al.
2008/0143119 A1 6/2008 Asada
2008/0157539 A1 7/2008 Tani et al.
2008/0180069 A1 7/2008 Sato
2008/0190703 A1 8/2008 Kato et al.

(Continued)

*Primary Examiner* — Thomas Moulis
(74) *Attorney, Agent, or Firm* — Finnegan, Henderson, Farabow, Garrett & Dunner LLP

(57) ABSTRACT

A control system is provided for a generator set coupled to supply electrical power to an external load. The control system may have an input device configured to receive input indicative of a desired adjustment to the external load, and a power control device operable to affect a power output of the generator set. The control system may also have a controller in communication with the input device and the power control device. The controller may be configured to determine a change in the power output of the generator set corresponding to the desired adjustment to the external load, and to operate the power control device to implement the change in power output of the generator set before the desired adjustment to the external load is initiated.

18 Claims, 2 Drawing Sheets

U.S. PATENT DOCUMENTS

2009/0023545 A1* 1/2009 Beaudoin ........................ 476/42
2009/0079399 A1* 3/2009 Ganev et al. .................... 322/25
2010/0109344 A1* 5/2010 Conway et al. ............. 290/40 A
2010/0193489 A1* 8/2010 Beeson et al. ................ 219/133
2010/0194356 A1* 8/2010 Fosbinder et al. .............. 322/25
2010/0241283 A1* 9/2010 Desai et al. ................... 700/295

* cited by examiner

GENSET CONTROL SYSTEM HAVING PREDICTIVE LOAD MANAGEMENT

TECHNICAL FIELD

The present disclosure is directed to a generator set (genset) control system and, more particularly, to a genset control system having predictive load management.

BACKGROUND

A generator set includes a combination of a generator and a prime mover, for example, a combustion engine. As a mixture of fuel and air is burned within the engine, a mechanical rotation is created that drives the generator to produce electrical power. Ideally, the engine drives the generator with a relatively constant torque and speed, and the generator accordingly produces an electrical power output having relatively constant characteristics (frequency, voltage, etc.). However, a load on the generator, and subsequently the engine, can be affected by external factors that are often unpredictable and cannot always be controlled. And, changes in load can affect operation of the engine and generator and cause undesirable fluctuations in characteristics of the electrical power output.

For example, when an external electrical load is applied suddenly to the generator, the generator will attempt to provide for the increase in electrical power demand by drawing more mechanical power from the engine and converting the additional mechanical power to electrical power. As a result of the increased mechanical load, the engine may lug (i.e., the engine may slow as a torque load increases) until additional fuel and air can be directed into the engine, and the engine can begin producing the higher output of mechanical power required by the generator. Similarly, when an electrical load is suddenly removed from the generator, the generator will quickly reduce its electrical power production by drawing less mechanical power from the engine. As a result of the decreased mechanical load, the engine may overspeed until the fuel and air directed into the engine can be reduced, and the engine produces a lesser amount of mechanical power. As a result of the engine lugging or overspeeding, characteristics of the electrical power produced by the generator nay fluctuate undesirably.

Historically, attempts to smooth fluctuations in the characteristics of the electrical power produced by a genset have included feedforward control. Specifically, there exists a time lag between when a change in electrical load is applied to the generator and when the corresponding change in mechanical load is actually accommodated by the engine. If the change in electrical load can be sensed soon enough after its application to the generator, a signal indicative of an impending mechanical load change can be directed to the engine before that mechanical load change causes the engine to operate undesirably. In this manner, the engine may be given time to respond to the impending mechanical load change prior to the mechanical load on the engine actually changing. This forewarning may help reduce a magnitude of engine lugging or overspeeding and, subsequently, of the electrical power characteristic fluctuations.

Although feedforward control has been shown to reduce lugging or overspeeding of a genset engine, it may still be improved upon. That is, the forewarning provided by feedforward control may be inadequate in some situations for the engine to fully respond to the impending load change. As a result, the engine may still lug or overspeed undesirably and, hence, the electrical power characteristics may still fluctuate undesirably. Thus, a new control is desired that further reduces the likelihood and magnitude of lugging or overspeeding as the result of an electric load change.

One attempt to provide such control is disclosed in U.S. Pat. No. 7,098,628 (the '628 patent) issued to Maehara et al. on Aug. 29, 2006. In particular, the '628 patent discloses a generation control system for a vehicle that includes an AC generator driven by an engine, a load current detector, a driving-torque-increase calculator, a field current control means, and an engine power adjusting means. During operation, the driving-torque-increase calculator calculates a predicted increase in driving torque required from the engine by the AC generator to provide for an increase in the current supplied to an electric load as detected by the load current detector. When the predicted increase in driving torque is greater than a predetermined value, the engine power adjusting means adjusts engine power according to the predicted increase. While engine power is being adjusted, the field current control means limits an increase rate of the generator's field current within a predetermined value. In one embodiment, the field current is limited until the engine attains a predetermined speed at the increased driving torque. In another embodiment, the field current is limited until a preset time passes after the engine power is adjusted. By limiting the field current during adjustment of engine power, the likelihood of engine lugging or overspeeding may be minimized.

Although the '628 patent may help minimize the likelihood of engine lugging or overspeeding, it may still be problematic. Specifically, because the field current is limited during the engine power adjustment, the electric power provided by the generator at that time may have undesired characteristics. And, because the engine power adjustment does not commence until after the change in electric load has already been applied to the generator, the duration of the less-than-desired electrical power output may be substantial.

SUMMARY

In one aspect, the disclosure is directed toward a control system for a generator set coupled to supply electrical power to an external load. The control system may include an input device configured to receive input indicative of a desired adjustment to the external load, and a power control device operable to affect a power output of the generator set. The control system may also include a controller in communication with the input device and the power control device. The controller may be configured to determine a change in the power output of the generator set corresponding to the desired adjustment to the external load, and to operate the power control device to implement the change in power output of the generator set before the desired adjustment to the external load is initiated.

In another aspect, the disclosure is directed toward a method of operating a generator set that supplies electrical power to an external load. The method may include determining a desired adjustment to the external load, and determining a change in the power output of the generator set corresponding to the desired adjustment to the external load. The method may also include implementing the change in the power output of the generator set before the desired adjustment to the external load is initiated.

DETAILED DESCRIPTION

Figure 1:
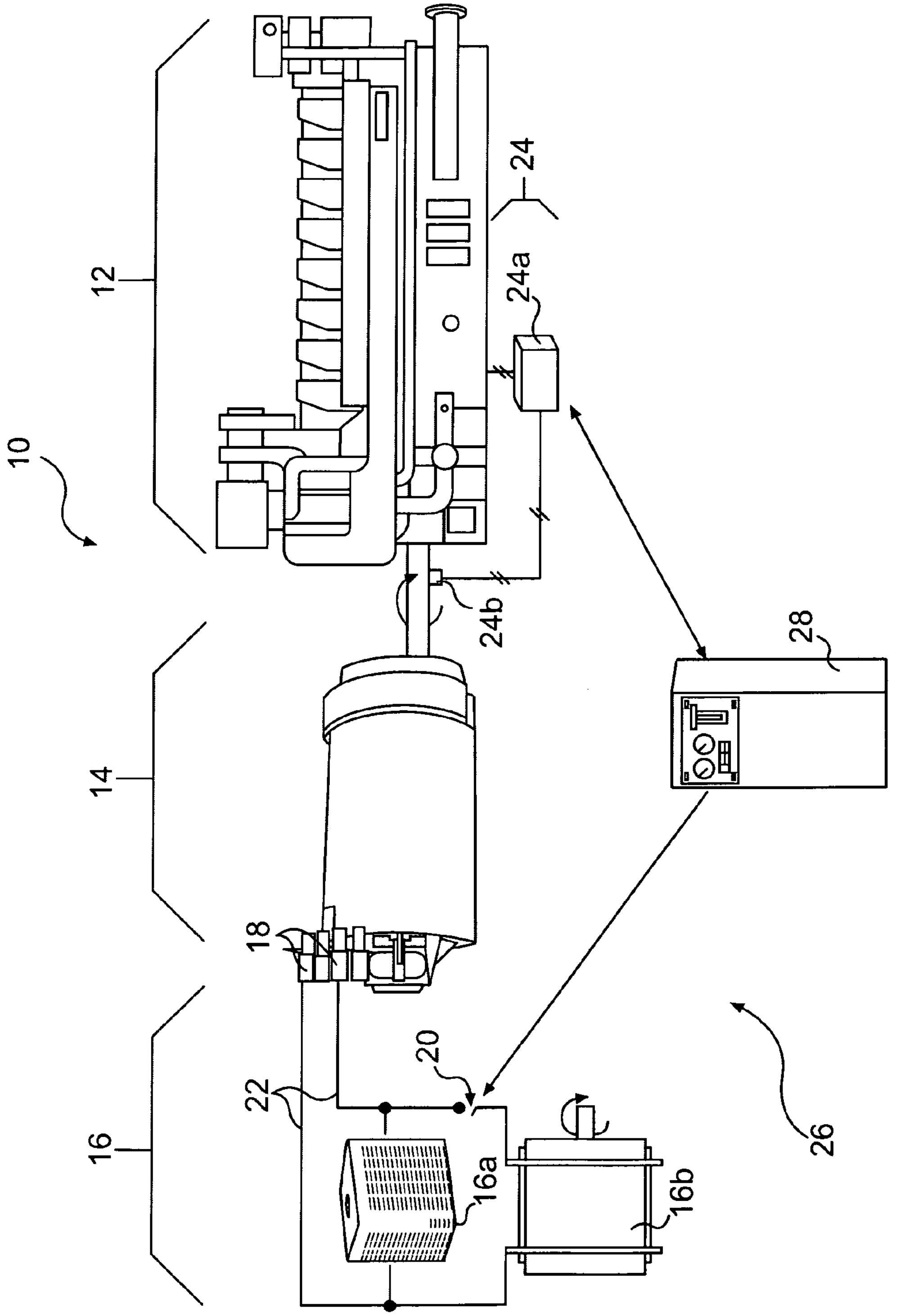
FIG. 1 is a pictorial illustration of an exemplary disclosed generator set.

FIG. 1 illustrates a generator set (genset) 10 having a prime mover 12 coupled to mechanically rotate a generator 14 that provides electrical power to an external load 16. For the purposes of this disclosure, prime mover 12 is depicted and described as a heat engine, for example an internal or external combustion engine that combusts a mixture of fuel and air to produce the mechanical rotation. One skilled in the art will recognize that prime mover 12 may be any type of combustion engine such as, for example, a diesel engine, a gasoline engine, or a gaseous fuel-powered engine. Generator 14 may be, for example, an AC induction generator, a permanent-magnet generator, an AC synchronous generator, or a switched-reluctance generator. In one embodiment, generator 14 may include multiple pairings of poles (not shown), each pairing having three phases arranged on a circumference of a stator (not shown) to produce an alternating current with a frequency of about 50 and/or 60 Hz. Electrical power produced by generator 14 may be directed for offboard purposes to external load 16 by way of one or more bus bars 18.

In one example, external load 16 may be associated with a stationary facility, for example, a manufacturing facility. As such, external load 16 may include one or more devices driven by electrical power from generator 14 to support operations at the manufacturing facility. In the illustrated embodiment, external load 16 includes an air conditioning unit 16*a* and an electric motor 16*b* associated with, for example, a manufacturing station or machine within the facility. It is contemplated that external load 16 may include additional or different electrical power consuming devices, if desired. One or more of the devices of external load 16 may be selectively connected to generator 14 by way of a switch 20, one or more feed lines 22, and bus bars 18.

In an exemplary application, switch 20 may be manually activated. It should be noted however, that switch 20 may alternatively be automatically activated in response to one or more input, if desired. As switch 20 is activated, electrical power from generator 14 may be directed to the associated device (e.g., to motor 16*b*) to power the device. And, as switch 20 is activated or deactivated, an electrical load on generator 14 may change by a corresponding amount. That is, as switch 20 is activated to power motor 16*b*, the electrical load on generator 14 may increase by an amount corresponding to the power draw of motor 16*b*. In contrast, as switch 20 is deactivated, the electrical load on generator 14 may decrease by that same amount.

It is contemplated that the electrical load change of generator 14 associated with the activation or deactivation of each device of external load 16 (i.e., that the power draw of each of air conditioner 16*a* and motor 16*b*) may be known prior to the activation or deactivation thereof. In one example, the known load change may be associated with a manufacturer's rating of the device. In another example, the load change may become known based on the selective activation of the device and a monitoring of a field current of generator 14 during the activation (i.e., the load change may become known based on historic performance). In yet another example, the load change may become known by completing a circuit of the device across a near infinite, known resistance and back calculating the load (i.e., the load change may be calculated, estimated, and/or measured directly).

Alternatively, the electrical load change of generator 14 associated with the activation or deactivation of each device of external load 16 may be assumed based on a known type of the device. For example, if the device is known to be a motor, it is generally well-accepted within the art that the device will have a startup power profile of initial high current followed by a gradual current decrease as the motor increases to a standard operational speed. And, depending on the size, make, model, and/or application of the device, the general magnitudes and rates of these assumed increases or decreases may be reasonably determined.

Operation of prime mover 12 may be affected by an electrical load change of generator 14 (i.e., by the activation or deactivation of external load devices). For example, as the load on generator 14 decreases (i.e., as air conditioner 16*a* or motor 16*b* is turned off via switch 20), generator 14 may require less mechanical power from prime mover 12 to satisfy the current demand. In contrast, as the load on generator 14 increases, generator 14 may require more mechanical power from prime mover 12.

To accomplish the change in mechanical power of prime mover 12 delivered to generator 14, prime mover 12 may be equipped with a power control device 24. In one example, power control device 24 may include an engine speed governor 24*a* and an associated engine speed sensor 24*b*, which together may be configured to affect a fueling of prime mover 12 in response to a rotational speed of prime mover 12 as is known in the art. With this exemplary configuration, as generator 14 draws more mechanical power from prime mover 12 and the speed of prime mover 12 subsequently decreases, power control device 24 may observe the speed decrease and responsively increase fueling of prime mover 12 to accommodate the change in load. Similarly, as generator 14 draws less mechanical power from prime mover 12 and the speed of prime mover 12 subsequently increases, power control device 24 may observe the speed increase and responsively decrease fueling of prime mover 12 to accommodate the change in load.

As described above, one purpose of power control device 24 may be to maintain a speed of prime mover 12 within a desired range while providing for the demands of external load 16 and generator 14. Thus, it is contemplated that power control device 24 may include engine-related components other than engine speed governor 24*a* and engine speed sensor 24*b* that accomplish the same or similar purposes, if desired. For example, power control device 24 may include a variable geometry turbocharger, a wastegate, a bypass valve, a variable valve actuator, an exhaust gas recirculation control valve, an air/fuel ratio control device, a throttle, a power storage and discharging device (e.g., an uninterruptable power supply—UPS), or any other device utilized to adjust a mechanical power output (speed and/or torque) of prime mover 12.

In order to help minimize speed changes of prime mover 12 and subsequent corresponding fluctuations in characteristics of the electrical power produced by generator 14, a control system 26 may be associated with genset 10. Control system 26 may include a controller 28 in communication with prime mover 12, generator 14, external load 16, switch 20, and/or power control device 24. In response to input indicative of a desire to adjust external load 16 (i.e., to activate or deactivate one or more of air conditioner 16*a* or motor 16*b*), controller 28 may first adjust operation of prime mover 12 via power control device 24 to accommodate an effect the desired change will have on prime mover 12 and/or generator 14, before causing switch 20 to close and initiate the desired change. In this manner, operation of genset 10 may remain within the desired operating range even during sudden activation or deactivation of external load devices.

Controller 28 may embody a single or multiple microprocessors, field programmable gate arrays (FPGAs), digital signal processors (DSPs), etc. that include a means for controlling an operation of genset 10 in response to various inputs. Numerous commercially available microprocessors can be configured to perform the functions of controller 28. It should be appreciated that controller 28 could readily embody a microprocessor separate from that controlling other genset functions, or that controller 28 could be integral with a general genset microprocessor and be capable of controlling numerous genset functions and modes of operation. If separate from the general genset microprocessor, controller 28 may communicate with the general genset microprocessor via datalinks or other methods. Various other known circuits may be associated with controller 28, including power supply circuitry, signal-conditioning circuitry, actuator driver circuitry (i.e., circuitry powering solenoids, motors, or piezo actuators), communication circuitry, and other appropriate circuitry.

The input indicative of the desire to adjust external load 16 (i.e., to activate or deactivate one or more of devices 16*a* or 16*b*) may be generated manually or automatically and received by controller 28 during operation of genset 10. In one example, the input may be associated with manual operation of switch 20. That is, when switch 20 is manually manipulated, a signal indicative of a desire to activate motor 16*b* may be generated and directed to controller 28. In this example, switch 20 may function as an input device generating the input indicative of the desire to adjust external load 16.

Alternatively, the input may be automatically generated in response to one or more predetermined conditions being satisfied. For example, the input signal may be generated in response to a monitored temperature exceeding or falling below an activation threshold temperature, thereby indicating a need to activate or deactivate air conditioner 16*a*. In this example, a temperature sensor (not shown) may function as the input device providing the input indicative of the desire to adjust external load 16.

In one embodiment, a time delay may be provided between receipt of the input indicative of the desire to adjust external load 16 and the actual closing of switch 20. For example, when switch 20 is manually manipulated (i.e., when an interface device associated with switch 20 is moved by an operator) and the input signal described above is generated and sent to controller 28, contacts within switch 20 may not actually be engaged to transmit power to motor 16*b* until after a predetermined time has elapsed. Similarly, in an automatically triggered situation, even after the monitored temperature described above has exceeded a threshold temperature that would normally result in activation of air conditioner 16*a*, no electrical power may yet be sent to or consumed by air conditioner 16*a* until after the signal has been sent to controller 28 and the required time period has elapsed. In this manner, power control device 24 may have sufficient time to respond to the impending change in power load (i.e., to increase fueling and speedup prime mover 12 or decrease fueling and slow down prime mover 12) before the change is actually experienced by genset 10.

In an alternative embodiment, the adjustment to external load 16 may be delayed until it is confirmed that prime mover 12 has sufficiently responded to the impending change in power load. In particular, controller 28 may wait to initiate the adjustment to external load 16 (i.e., wait to engage the contacts of switch 20) until after a signal from power control device 24 has been received (i.e., until a signal from engine speed sensor 24*b* has been received) indicating that prime mover 12 has responded appropriately to the impending load change.

In either the manual or automated embodiments described above, information in addition to the input indicative of the desire to adjust external load 16 may be provided to controller 28. Specifically, information regarding a type of the external load device may be provided. For example, upon manual manipulation of switch 20 or when the monitored temperature exceeds or falls below an activation threshold temperature, a signal providing information about the type of associated device (e.g., information about whether the device is air conditioner 12*a* or motor 12*b*) may be provided to controller 28. In this manner, even if the magnitude of the desired adjustment is unknown, controller 28 may assume a profile of the impending adjustment based on the type of device, as described above, and cause prime mover 12 to respond accordingly.

INDUSTRIAL APPLICABILITY

The disclosed control system may be implemented into any power generation application where performance fluctuations are undesirable. The disclosed control system may help minimize performance fluctuations by accounting for impending load changes before the load changes are initiated. Operation of control system 26 will now be described.

Figure 2:
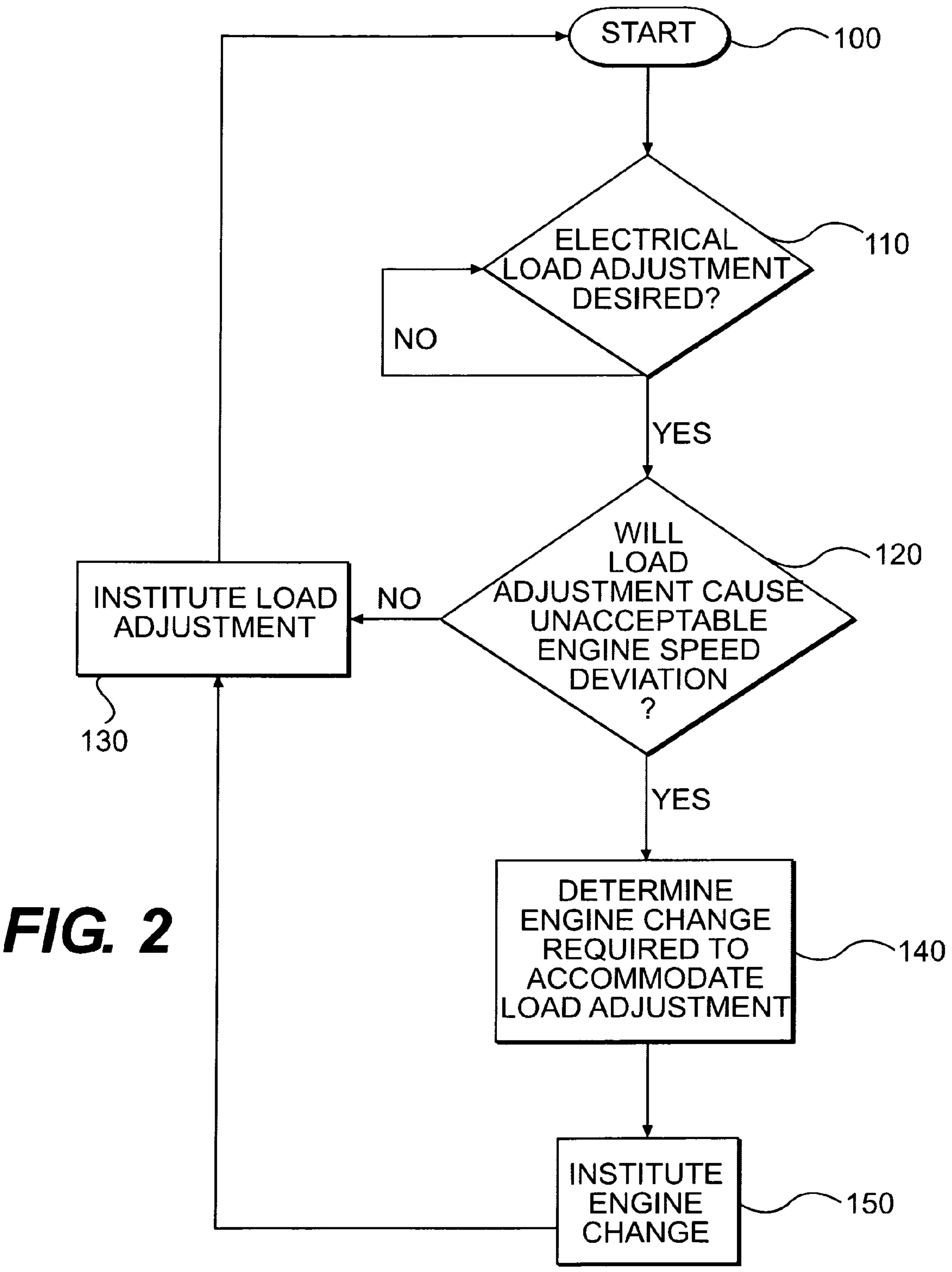
FIG. 2 is a flowchart depicting an exemplary method of operating the generator set of FIG. 1.

As illustrated in FIG. 2, operation of control system 26 may initiate at startup of genset 10 (Step 100). During operation, controller 28 may receive input indicative of a desire to adjust electrical load 16 (i.e., to adjust an operational status of air conditioner 16*a* and/or motor 16*b*). As described above, the input may be manually generated in response to operator manipulation of switch 20, or automatically generated in response to sensed parameters, for example, a sensed ambient temperature. In some applications, the parameters may be sensed and/or communication indicative thereof directed to controller 28 via an external programmable logic controller (PLC), if desired. Based on this input, controller 28 may determine if the desire to adjust electrical load 16 exists (Step 110). If no desired adjustment exists, control may continually loop through step 110.

However, if at step 110, controller 28 determines that a desired adjustment to external load 16 exits, controller 28 may then determine if the desired adjustment could significantly affect performance of prime mover 12 in an undesired manner. That is, controller 28 may determine if prime mover 12 will lug or overspeed (i.e., deviate from a desired range) significantly as a result of the desired adjustment (Step 120). Controller 28 may determine if prime mover 12 will lug or overspeed by comparing the known load associated with the desired adjustment to a load change threshold and/or known performance parameters of prime mover 12. In some situations, controller 28 may need to first measure or determine the magnitude and/or the profile of the known load, as described above, before making the comparison to determine an affect on prime mover 12. If the known load is less than the load change threshold, controller 28 may institute the desired load adjustment (Step 130) without delay, restriction, or predictive control of power control device 24.

However, if the desired adjustment could cause operation of prime mover 12 to deviate from a desired operating range (i.e., if the known load exceeds the load change threshold and prime mover 12 will likely lug or overspeed), controller 28 may determine a change in the operation of prime mover 12 required to accommodate the desired adjustment (i.e., the adjustment required to provide for the electrical power demand and to maintain operation of prime mover 12 within the desired range) (Step 140). Controller 28 may determine the operational change of prime mover 12 required to accommodate the desired adjustment of external load 16 by referencing the known load with one or more electronic relationship maps stored in memory. Controller 28 may then predictively institute the required change via power control device 24 (Step 150).

After the required operational change of prime mover 12 has occurred, controller 28 may then institute the desired adjustment to external load 16 (Step 130). That is, after the associated delay time period has expired or it has been confirmed that prime mover 12 has sufficiently responded to the notice of impending load change, the contacts within switch 20 may be closed to provide power to the appropriate ones of air conditioner 16*a* and motor 16*b*.

Because the disclosed control system may predictively regulate operation of prime mover 12 before the desired adjustment of external load 16 is initiated, the electrical power provided to external load 16 may meet customer demands (i.e., has desired characteristics) as soon as the activation status of the associated device is adjusted. And, by regulating prime mover operation before the desired load adjustment is initiated, the response time of genset 10 may be improved. Further, because the load change of the desired adjustment may be known prior to its application to genset 10, the response of prime mover 12 may be appropriate for the impending change.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. A control system, comprising:

an electric generator set coupled to supply electrical power to a plurality of external electrical loads;

an input device configured to receive input requesting activation of an external electrical load of the plurality of external electrical loads;

a power control device operable to affect a power output of the generator set; and a controller in communication with the input device and the power control device, the controller being configured to:

receive, responsive to the input, information identifying the external electrical load requested to be activated;

determine, based on the information identifying the external electrical load, a startup power profile for the external electrical load;

determine a change in the power output of the generator set corresponding to the startup power profile for the external electrical load; and operate the power control device to implement the change in power output of the generator set before the requested activation of the external electrical load is initiated.

2. The control system of claim 1, wherein the input device is a manual input device.

3. The control system of claim 2, wherein the input device is an activation switch configured to initiate operation of the external electrical load.

4. The control system of claim 3, wherein the controller is further configured to:

associate a time delay with the activation switch; and inhibit operation of the external electrical load until after the change in power output of the generator set has been implemented.

5. The control system of claim 3, further including a sensor configured to generate a signal indicative of operation of the generator, wherein the controller is configured to inhibit operation of the external electrical load until the signal indicates a desired amount of the change in power output of the generator set has been implemented.

6. The control system of claim 1, wherein the power control device is associated with an engine of the generator set.

7. The control system of claim 6, wherein the power control device is configured to affect at least one of fueling and air flow of the engine.

8. The control system of claim 1, wherein the startup power profile for the external electrical load is known prior to receipt of the input.

9. The control system of claim 1, wherein the controller is configured to determine the startup power profile for the external electrical load by measuring a magnitude of the startup power profile for the external electrical load when the input is received and before activation of the external load is initiated.

10. The control system of claim 1, wherein the information identifying the external electrical load includes a type of the external electrical load, and the controller is configured to determine the startup power profile for the external electrical load based on the type of the external electrical load when the input is received and before activation of the external electrical load is initiated.

11. A method for supplying electrical power, comprising:

operating an electric generator set that supplies electrical power to a plurality of external electrical loads;

receiving input requesting activation of an external electrical load of the plurality of external electrical loads;

responsive to the input, receiving information identifying the external electrical load requested to be activated;

determining, based on the information identifying the external electrical load, a startup power profile for the external electrical load;

determining a change in the power output of the generator set corresponding to the startup power profile for the external electrical load; and implementing the change in the power output of the generator set before the requested activation of the external electrical load is initiated.

12. The method of claim 11, further including delaying activation of the external electrical load an amount of time after receipt of the manual input such that the change in power output of the generator set is implemented before activation of the external electrical load.

13. The method of claim 11, further including:

sensing operation of the generator; and delaying activation of the external electrical load after receipt of the manual input until the sensed operation of the generator indicates a desired amount of the change in the power output corresponding to the requested activation of the external electrical load has been implemented.

14. The method of claim 11, wherein the startup power profile for the external electrical load is known prior to receipt of the manual input.

15. The method of claim 11, wherein determining the startup power profile for the extern load includes measuring a magnitude of a required startup power of the external electrical load when the manual input is received and before activation of the external electrical load is initiated.

16. The method of claim 11, wherein the information identifying the external electrical load includes a type of the external electrical load, and the method further includes determining the startup power profile based on the type of the external electrical load when the manual input is received and before activation of the external electrical load is initiated.

17. A generator set, comprising:

a prime mover;

a prime mover control device operable to affect a mechanical power output of the prime mover;

an electric generator driven by the mechanical power output of the prime mover to create an electrical power output used to power a plurality of external electrical loads;

an input device configured to receive input requesting activation of an external electrical load of the plurality of external electrical loads; and a controller in communication with the prime mover control device and the input device, the controller being configured to:

receive, responsive to the input, information identifying the external electrical load requested to be activated;

determine, based on the information identifying the external electrical load, a startup power profile for the external electrical load;

determine a change in mechanical power output of the prime mover corresponding to the startup power profile for the external electrical load; and operate the prime mover control device to implement the change in mechanical power output of the prime mover before the desired requested activation of the external electrical load is initiated.

18. The control system of claim 1, wherein the controller is further configured to:

determine whether the requested activation of the external electrical load powered would cause a change in speed of the prime mover greater than a threshold; and responsive to determining that the requested activation of the external electrical load powered would cause a change in speed of the prime mover greater than the threshold:

determine a change in the power output of the generator set corresponding to the startup power profile for the external electrical load; and operate the power control device to implement the change in power output of the generator set before the desired activation of the external electrical load is initiated.

* * * * *